United States Patent
Levola et al.

(10) Patent No.: US 8,120,762 B2
(45) Date of Patent: *Feb. 21, 2012

(54) LIGHT GUIDE AND OPTICAL SENSING MODULE INPUT DEVICE AND METHOD FOR MAKING SAME

(75) Inventors: Tapani Levola, Tampere (FI); Seppo Pienimaa, Espoo (FI)

(73) Assignee: Nokia Corporation, Espoo (FI)

( * ) Notice: Subject to any disclaimer, the term of this patent is extended or adjusted under 35 U.S.C. 154(b) by 431 days.

This patent is subject to a terminal disclaimer.

(21) Appl. No.: 12/315,177

(22) Filed: Nov. 26, 2008

(65) Prior Publication Data

US 2009/0141285 A1    Jun. 4, 2009

Related U.S. Application Data

(60) Provisional application No. 61/004,833, filed on Nov. 30, 2007.

(51) Int. Cl.
*G01N 21/00* (2006.01)
(52) U.S. Cl. .................. 356/73.1; 359/850; 345/175
(58) Field of Classification Search .............. 356/614; 359/569, 850; 385/37; 345/175
See application file for complete search history.

(56) References Cited

U.S. PATENT DOCUMENTS

| 7,548,677 | B2 * | 6/2009 | Bathiche et al. | 385/129 |
| 2007/0152985 | A1 * | 7/2007 | Ostergaard et al. | 345/176 |
| 2011/0102372 | A1 * | 5/2011 | Han et al. | 345/175 |

* cited by examiner

*Primary Examiner* — Tarifur Chowdhury
*Assistant Examiner* — Tara S Pajoohi
(74) *Attorney, Agent, or Firm* — Ware, Fressola, Van Der Sluys & Adolphson, LLP

(57) ABSTRACT

A light guide has a first surface and a second surface with diffractive structures. A slanted facet is provided at one corner of the light guide. The diffractive structures have concentric fringes centered near the slanted facet. Fringes are arranged such that a light beam directed from the first surface at a location P toward the second surface is diffracted by the fringes only if the beam encounters the diffractive structures at a certain direction. The diffracted beam is guided and exits through the slanted surface at an exiting angle, which is correlated to the location P. If the light guide is illuminated in such a way that when an object is present at the first surface, it changes the light intensity of the exiting light beam. By detecting the exiting angle and the change of light intensity, the location of the object can be determined.

21 Claims, 4 Drawing Sheets

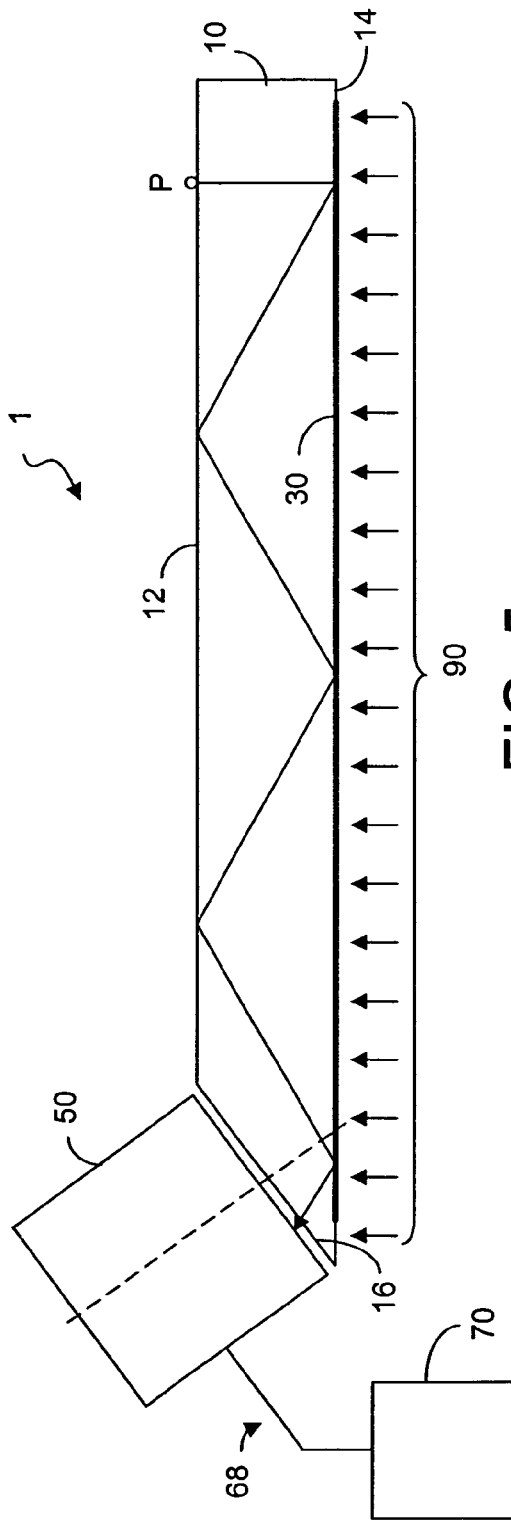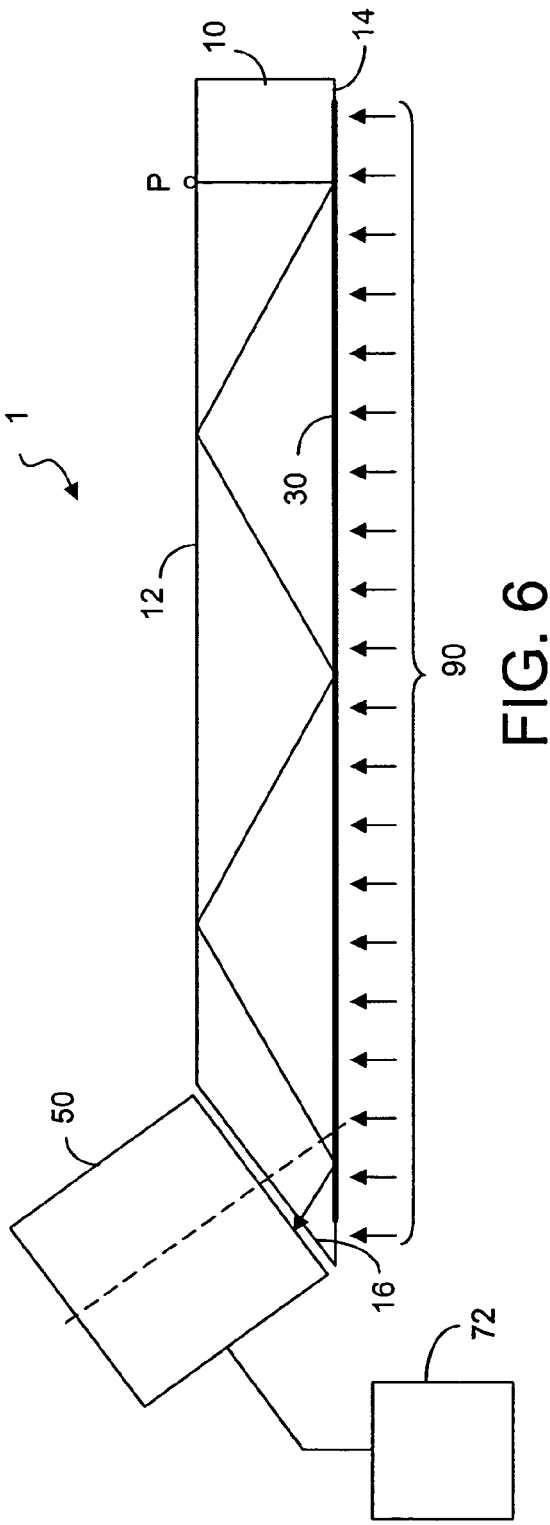

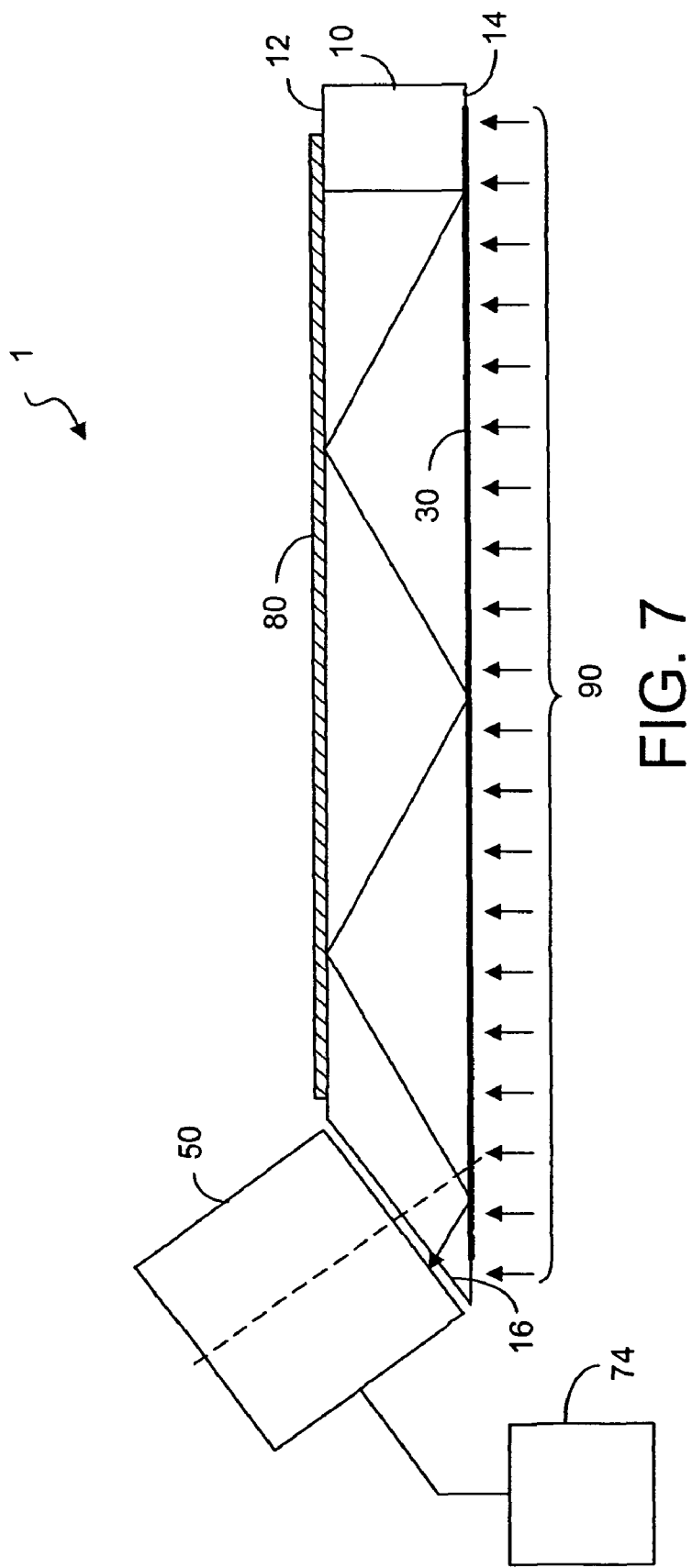

LIGHT GUIDE AND OPTICAL SENSING MODULE INPUT DEVICE AND METHOD FOR MAKING SAME

PRIORITY AND CROSS-REFERENCE TO RELATED APPLICATION

This application claims priority from U.S. Patent Application Ser. No. 61/004,833 filed on Nov. 30, 2007.

FIELD OF THE INVENTION

The present invention relates generally to an input device and, more particularly, to a light guide coupled to an optical sensor.

BACKGROUND OF THE INVENTION

Some electronic devices require an input device, such as a touch pad, for inputting graphical information. Typically a touch pad has a surface for allowing a user to touch the surface at one or more locations. Various sensing technologies have been developed to sense the touch locations.

It is desirable and advantageous to provide an input device that is inexpensive and easy to mass-produce.

SUMMARY OF THE INVENTION

The present invention provides a light guide having a first surface and a second surface substantially parallel to the first surface, and diffractive structures located on the second surface. A slanted facet is provided at one corner of the light guide. The diffractive structures have concentric fringes centered near the slanted facet. Fringes are arranged such that a light beam directed from the first surface at a location P toward the second surface is diffracted by the fringes only if the beam encounters the diffractive structures substantially at a predefined direction. The diffracted beam is guided in the light guide and subsequently exits through the slanted surface at an exiting angle, which is correlated to the location P. If the light guide is illuminated in such a way that when an object is present at the first surface, it changes the light intensity of the exiting light beam. By detecting the exiting angle and the change of light intensity, the location of the object can be determined.

Thus, the first aspect of the present invention is an apparatus, which comprises: a light guide having a first surface, an opposing second surface, and a slanted facet located at a corner of the light guide, said slanted facet extending at least from the first surface toward the second surface; and an optical sensing module located at the slanted facet, wherein the light guide comprises a diffractive element on the second surface, the diffractive element comprising a plurality of curved fringes arranged such that when a light beam is directed from a location on the first surface toward the second surface at a predefined direction, the light beam is diffracted toward the first surface by the diffractive element and guided by the light guide toward the slanted facet, and then exits through the slanted facet as an exit light beam toward the optical sensing module at an exiting angle, the exiting angle indicative of a distance between said location and a reference point at said corner. The first surface is substantially parallel to the second surface, and the fringes are substantially concentric about a point at said corner.

The fringes can be interference fringes or a surface relief grating.

The optical sensing module can be an image sensor to form an image indicative of light intensity distributed over the first surface, and the image can show an image spot corresponding to a position at the first surface. The position at the first surface is representable by polar coordinate values, wherein the polar coordinate values comprise a first value indicative of a distance from the position to the reference point, and a second value indicative of an angle relative to a line of reference. The image spot is presentable by two coordinates in a coordinate system and wherein the polar coordinate values are determinable from the two coordinates.

The image data from the optical sensing module can be provided to a processor for determining the coordinates of a point of the first surface. The image data from the optical sensing module can be provided to a display device for displaying.

The second aspect of the present invention is a method, which comprises:

arranging a diffractive element on a light guide having a first surface, an opposing second surface, and a slanted facet located at a corner of the light guide, said slanted facet extending at least from the first surface toward the second surface wherein the diffractive element is arranged on the second surface, wherein the diffractive element comprises a plurality of curved fringes arranged such that when a light beam is directed from a location on the first surface toward the second surface at a predefined direction, the light beam is diffracted toward the first surface by the diffractive element and guided by the light guide toward the slanted facet, and the light beam exits through the slanted facet as an exit light beam at an exiting angle, the exiting angle indicative of a distance between said location and a reference point at said corner; and arranging an optical sensing module located at the slanted facet for receiving the exit light beam.

In one embodiment of the present invention, a light source is arranged for illuminating the light guide from the second surface toward the first surface, such that when an object is present at said position at the second surface, the light level in said image spot in the image is caused to change.

In another embodiment of the present invention, the optical sensing module comprises an imaging sensor for providing image data indicative of the image and the image data is provided to a processor for determining the position, or to a display device for displaying.

The present invention will become apparent upon reading the description taken in conjunction with FIG. 1 to FIG. 7.

BRIEF DESCRIPTION OF THE DRAWINGS

FIG. 5 shows a processor for determining the coordinates of the touch object.

FIG. 6 shows a display device for displaying the image.

FIG. 7 shows the input device being used as an optical scanner.

DETAILED DESCRIPTION OF THE INVENTION

Figure 1:
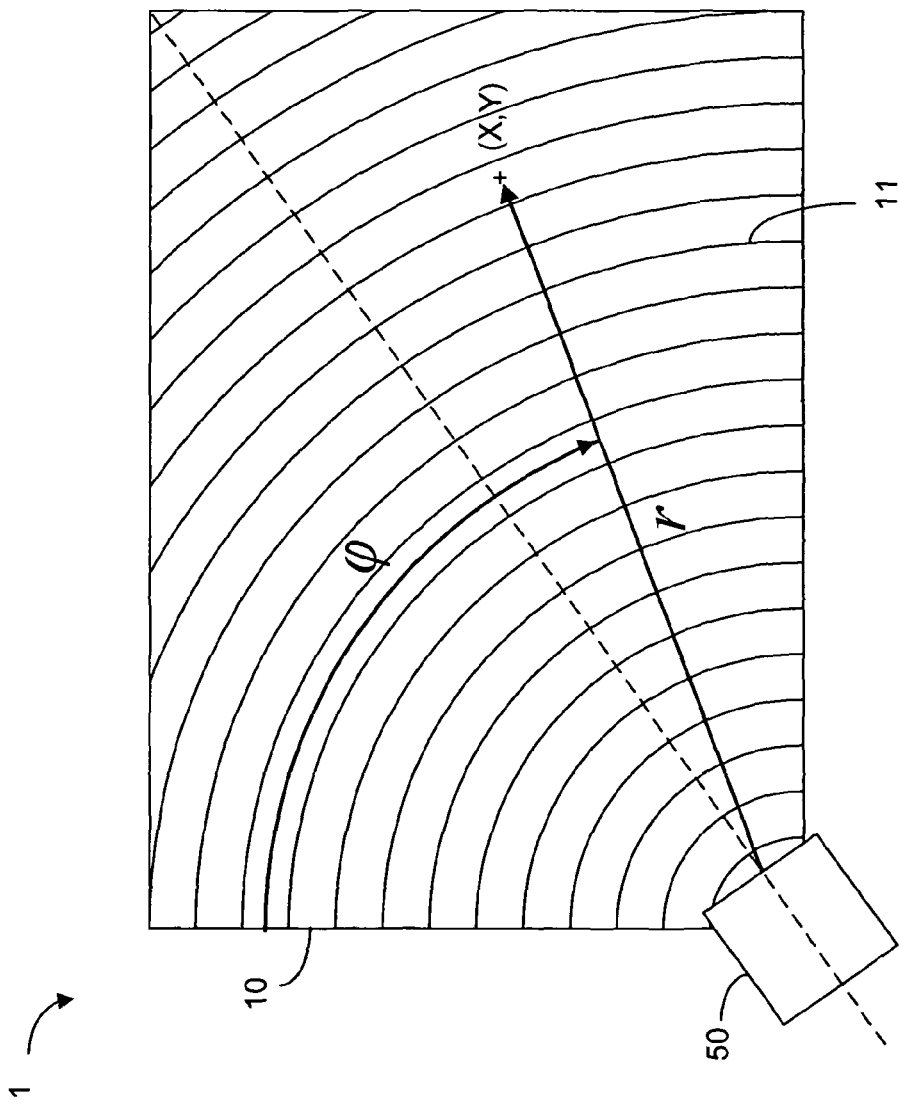
FIG. 1 shows a top-view of the input device, according to one embodiment of the present invention.

The input device, according to embodiments of the present invention, comprises mainly a light guide and an optical sensing module coupled to the light guide. The light guide has a touch surface to allow a user to place an object on the touch surface at a location and the optical sensing module is configured to determine the touch location in relationship to a reference point. As shown in FIG. 1, the input device 1 includes a light guide 10 and an optical sensing module, such as a camera or optical sensing module 50 located at one corner of the light guide. The camera 50 is used to determine the location of a touch object placed on the surface of the light guide. As shown in FIG. 1, the location at a point (x, y) can be determined by the angle $\phi$ and the distance r:

$$x = r \sin \phi,$$

$$y = r \cos \phi$$

The light guide 10 has one or more diffractive elements or structures forming substantially concentric fringes 11 centered at a point near or at the camera 50. The center of the concentric fringes can be located at a point of the camera aperture, for example, and used as the reference point for determining the distance r. One of the functions of the diffractive structures is to allow the camera to determine r.

Figure 2:
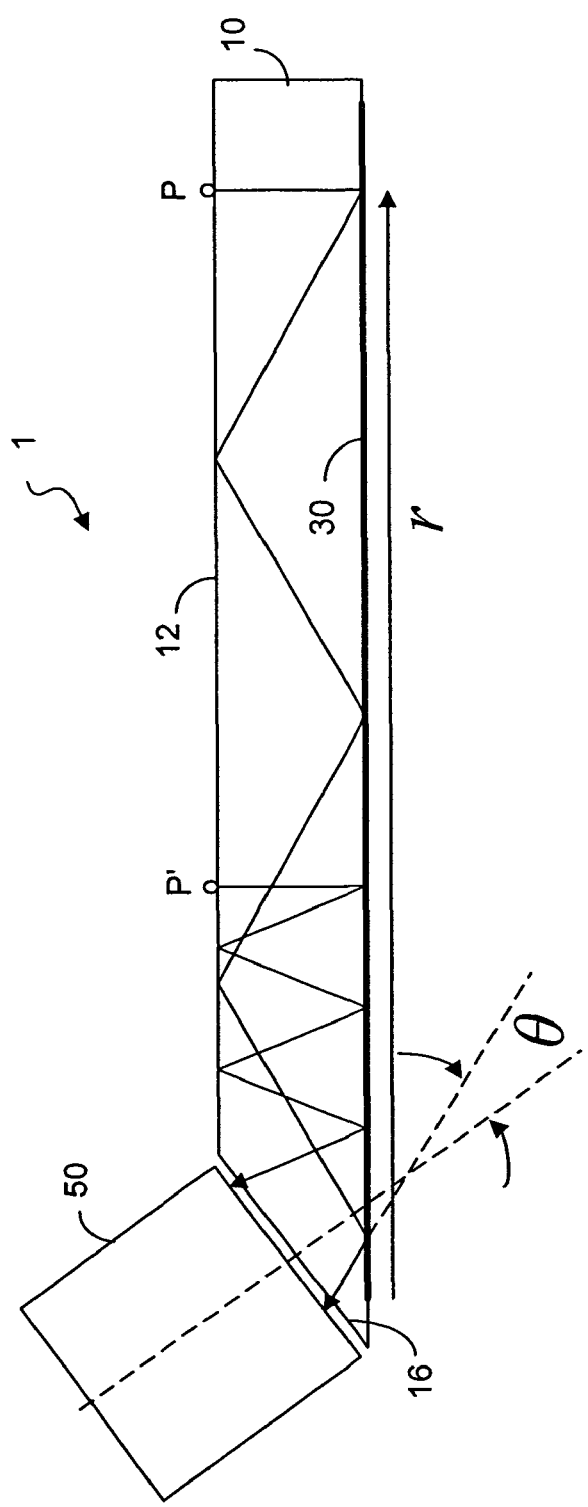
FIG. 2 shows a side view of the input device.

As shown in FIG. 2, the light guide 10 has a first surface 12 used as a touch input surface, and a second surface 14 for implementing the diffractive structures 30. The light guide 10 also has a slanted facet 16 at least extending from the first surface toward the second surface. The placement of the camera 50 at the slanted facet 16 allows the camera 50 to "peer into" the light guide 10 through the slanted facet 16. In particular, the camera 50 is configured to see a large area of the first surface 12 from the inside of the light guide 10. As such, the camera 50 is able to detect one or more touch objects at one or more touch locations on the first surface 12.

According to one embodiment of the present invention, the concentric fringes 11 in the diffractive structures 30 form an angular sensitive grating, such that a light beam directed from a location P on the first surface to another point on the second surface is more significantly diffracted toward the first surface by the diffractive structures 30 only when the beam counters the diffractive structures 30 substantially at a predefined angle or direction. The diffracted beam may be reflected by the first surface a number of times before it exits through the slanted facet 16 an exiting angle $\theta$. For example, the beam that encounters the diffractive structures 30 at a 90 degree angle (or the beam direction is substantially perpendicular to the second surface) will be significantly diffracted and form an exiting beam, as shown in FIG. 2. The concentric fringes are arranged such that the exiting angle $\theta$ is related to the distance between the location P and the corner. As the distance is a function of the exiting angle $\theta$, a light beam enters or is directed from the first surface at a different distance and will exit the slanted facet at a different exiting angle $\theta$. The camera 50 placed adjacent to the slanted facet 16 is configured to determine the distance of the directing point at least partly based on the exiting angle $\theta$. Because the fringes are concentric about a point at the corner, the exiting angle $\theta$ does not vary with $\phi$. Thus, the distance r can be determined by $\theta$ and the thickness of the light guide, for example. From the angular information in $\theta$ and $\phi$, the camera 50 is able to determine the location of light directing point P on the first surface. Thus, the present invention uses the transformations $(\theta, \phi) \rightarrow (r, \phi)$ and $(r, \phi) \rightarrow (x, y)$ to determine the location of a touch event.

According to various embodiments of the present invention, the camera 50 is configured to obtain the intensity of an exiting beam. When an object is present at a point P, the amount of light directed at that point may change. Thus, the optical sensing module is able to determine a touch event and the touch location from the change in the intensity of the exit beam.

Figure 4:
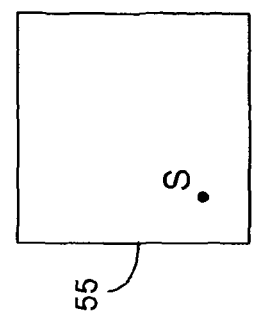
FIG. 4 shows an image having a spot resulting from a touch object on the device surface.
Figure 3:
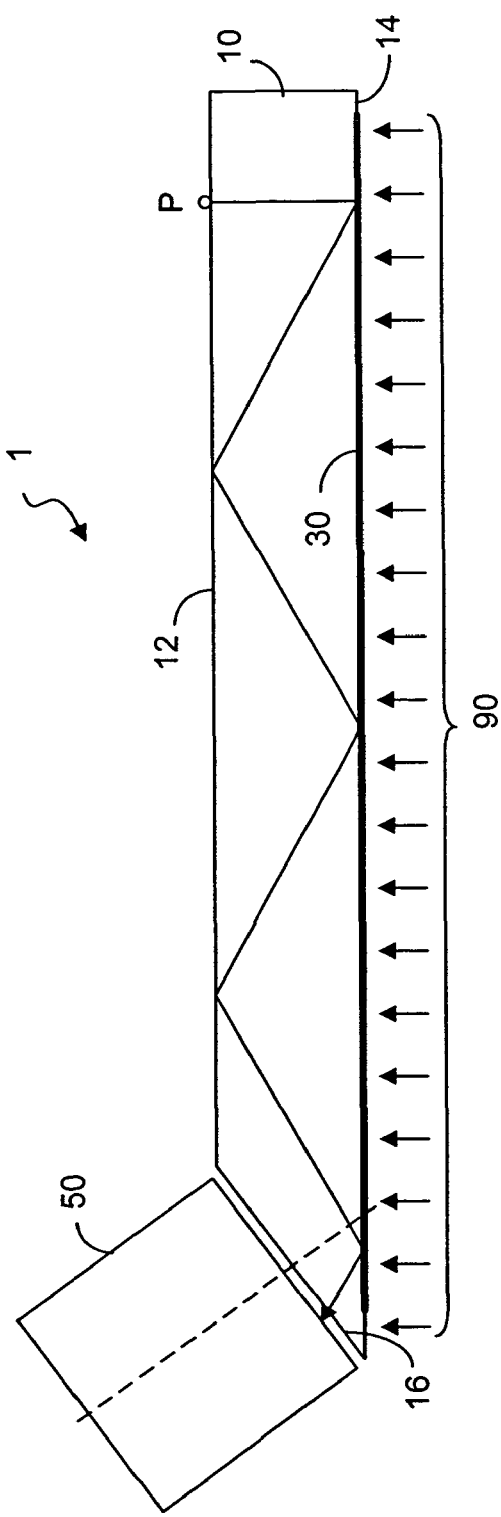
FIG. 3 shows a light beam for illuminating the input device.

In one embodiment of the present invention, a light source having a broad light beam 90 is provided to illuminate the light guide 10 through the second surface and the diffractive structures 30, as shown in FIG. 3. When the first surface 12 is not touched by any object, the camera 50 may see a blank image indicative of a distribution of light intensity resulting from the reflection of the light beam 90 by the first surface 12. When an object is present at the first surface, for example, a spot S would appear in the blank image 55, as shown in FIG. 4. The brightness or darkness of the spot is determined by the color, and the surface characteristics of the touch object. For example, if the touch object is white, highly reflective or light emitting, the spot is brighter than other areas of the image. If the touch object is black or light absorbing, the spot could be dark.

Furthermore, the image data 68 from the optical sensing module or camera 50 can be provided to a processor 70 (see FIG. 5), so as to allow the processor 50 to determined the coordinates (x, y) of a touch object based on the exiting angle of the exit beam or the location of the spot S on the image 55.

In another embodiment of the present invention, the optical sensing module 50 is arranged to provide the image data to a display device 72 for displaying the image, as shown in FIG. 6.

The input device 1 can be used as a touch screen wherein the touch location can be determined by the processor 70 as shown in FIG. 5. The input device 1 can also be used as an optical scanner. As shown in FIG. 7, when a document or a picture 80 is placed face-down on the first surface 12 of the light guide 10, an image of the document 80 is formed in the optical sensing module or camera 50. The image can be processed by a processor 70 as shown in FIG. 5, or displayed in a display device 72 as shown in FIG. 6, or stored in a storage medium 74 as shown in FIG. 7.

Thus, the first aspect of the present invention is an apparatus, which a light guide having a first surface, an opposing second surface, and a slanted facet located at a corner of the light guide, said slanted facet extending at least from the first surface toward the second surface; and an optical sensing module located at the slanted facet, wherein the light guide comprises a diffractive element on the second surface, the diffractive element comprising a plurality of curved fringes arranged such that when a light beam is directed from a location on the first surface toward the second surface at a predefined direction, the light beam is diffracted toward the first surface by the diffractive element and guided by the light guide toward the slanted facet, and then exits through the slanted facet as an exit light beam toward the optical sensing module at an exiting angle, the exiting angle indicative of a distance between said location and a reference point at said corner. The first surface is substantially parallel to the second surface, and the fringes are substantially concentric about a point at said corner.

The fringes can be interference fringes or a surface relief grating.

The optical sensing module can be an image sensor to form an image indicative of light intensity distributed over the first surface, and the image can show an image spot corresponding to a position at the first surface. The position at the first surface is representable by polar coordinate values, wherein the polar coordinate values comprise a first value indicative of a distance from the position to the reference point, and a second value indicative of an angle relative to a line of reference. The image spot is presentable by two coordinates in a coordinate system and wherein the polar coordinate values are determinable from the two coordinates.

The image data from the optical sensing module can be provided to a processor for determining the coordinates of a point of the first surface. The image data from the optical sensing module can be provided to a display device for displaying.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An apparatus, comprising:
   a light guide having a first surface, an opposing second surface, and a slanted facet located at a corner of the light guide, said slanted facet extending at least from the first surface toward the second surface; and
   an optical sensing module located at the slanted facet, wherein the light guide comprises a diffractive element on the second surface, the diffractive element comprising a plurality of curved fringes arranged such that when a light beam is directed from a location on the first surface toward the second surface at a predefined direction, the light beam is diffracted toward the first surface by the diffractive element and guided by the light guide toward the slanted facet, and then exits through the slanted facet as an exit light beam toward the optical sensing module at an exiting angle, the exiting angle indicative of a distance between said location and a reference point at said corner.

2. The apparatus of claim 1, wherein the first surface is substantially parallel to the second surface.

3. The apparatus of claim 1, wherein the fringes are substantially concentric about a point at said corner.

4. The apparatus of claim 1, wherein the fringes comprise interference fringes.

5. The apparatus of claim 1, wherein the diffractive element comprises a surface relief grating.

6. The apparatus of claim 1, wherein the predefined direction is substantially perpendicular to the second surface.

7. The apparatus of claim 1, wherein the optical sensing module is configured to provide an image indicative of light intensity distributed over the first surface, the image comprising an image spot corresponding to a position at the first surface.

8. The apparatus of claim 7, wherein the position at the first surface is representable by polar coordinate values, wherein the polar coordinate values comprise a first value indicative of a distance from the position to the reference point, and a second value indicative of an angle relative to a line of reference.

9. The apparatus of claim 8, wherein the image spot is presentable by two coordinates in a coordinate system and wherein the polar coordinate values are determinable from the two coordinates.

10. The apparatus of claim 7, wherein when an object is present at said position at the first surface, a light level in said image spot in the image is caused to change.

11. The apparatus of claim 7, wherein the optical sensing module comprises an imaging sensor for providing image data indicative of the image.

12. A touch screen device comprising an apparatus according to claim 1.

13. An optical scanning device comprising an apparatus according to claim 1.

14. A method comprising:
   arranging a diffractive element on a light guide having a first surface, an opposing second surface, and a slanted facet located at a corner of the light guide, said slanted facet extending at least from the first surface toward the second surface wherein the diffractive element is arranged on the second surface, wherein the diffractive element comprises a plurality of curved fringes arranged such that when a light beam is directed from a location on the first surface toward the second surface at a predefined direction, the light beam is diffracted toward the first surface by the diffractive element and guided by the light guide toward the slanted facet, and the light beam exits through the slanted facet as an exit light beam at an exiting angle, the exiting angle indicative of a distance between said location and a reference point at said corner; and
   arranging an optical sensing module at the slanted facet for receiving the exit light beam.

15. The method of claim 14, wherein the fringes are substantially concentric about a point at said corner.

16. The method of claim 14, wherein the optical sensing module is configured to provide an image indicative of light intensity distributed over the first surface, the image comprising an image spot corresponding to a position at the first surface.

17. The method of claim 16, wherein the position at the second surface is representable by polar coordinate values, wherein the polar coordinate values comprise a first value indicative of a distance from the position to the reference point, and a second value indicative of an angle relative to a line of reference.

18. The method of claim 17, wherein the image spot is presentable by two coordinates in a coordinate system and wherein the polar coordinate values are determinable from the two coordinates.

19. The method of claim 18, wherein the optical sensing module comprises an imaging sensor for providing image data indicative of the image, said method further comprising:
   providing the image data to a processor for determining the position.

20. The method of claim 18, wherein the optical sensing module comprises an imaging sensor for providing image data indicative of the image, said method further comprising:
   providing the image data to a display for displaying the image.

21. The method of claim 16, further comprising:
   arranging a light source for illuminating the light guide from the second surface toward the first surface, such that when an object is present at said position at the second surface, a light level in said image spot in the image is caused to change.

* * * * *